(12) United States Patent
Kitaura et al.

(10) Patent No.: US 6,764,736 B2
(45) Date of Patent: Jul. 20, 2004

(54) OPTICAL INFORMATION RECORDING MEDIUM AND RECORDING METHOD USING THE SAME

(75) Inventors: Hideki Kitaura, Souraku-gun (JP); Noboru Yamada, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 55 days.

(21) Appl. No.: 10/183,178

(22) Filed: Jun. 25, 2002

(65) Prior Publication Data

US 2003/0017367 A1 Jan. 23, 2003

(30) Foreign Application Priority Data

Jul. 12, 2001 (JP) ........................................ 2001-211824

(51) Int. Cl.[7] ................................................ B32B 3/02
(52) U.S. Cl. .................... 428/64.1; 428/64.4; 428/64.5; 428/64.6; 430/270.13
(58) Field of Search ............................ 428/64.1, 64.4, 428/64.5, 64.6, 913; 430/270.13, 495.1, 945; 369/283, 288

(56) References Cited

U.S. PATENT DOCUMENTS

| | | |
|---|---|---|
| 4,847,132 A | 7/1989 | Takao et al. |
| 6,153,063 A | 11/2000 | Yamada et al. |
| 6,456,584 B1 * | 9/2002 | Nagata .................... 369/275.2 |
| 6,511,788 B1 * | 1/2003 | Yasuda ................... 430/270.13 |
| 2002/0110081 A1 * | 8/2002 | Rijpers ....................... 369/284 |

FOREIGN PATENT DOCUMENTS

| | | |
|---|---|---|
| EP | 0 720 159 | 7/1996 |
| EP | 0 957 477 | 11/1999 |
| JP | 63-103453 | 5/1988 |
| JP | 3-104038 | 5/1991 |
| JP | 5-217211 | 8/1993 |
| JP | 9-212917 | 8/1997 |
| JP | 2000-36130 | 2/2000 |
| WO | WO 96/31875 | 10/1996 |
| WO | WO 97/34298 | 8/1997 |

* cited by examiner

Primary Examiner—Elizabeth Mulvaney
(74) Attorney, Agent, or Firm—Merchant & Gould P.C.

(57) ABSTRACT

An optical information recording medium of the present invention includes a first substrate, a second substrate placed in parallel with the first substrate, and an information layer placed between the first substrate and the second substrate, wherein the information layer includes a recording layer and a dielectric layer (lower dielectric layer/upper dielectric layer) placed so that a distance from the dielectric layer to the recording layer is 20 nm or less. The recording layer is changed between at least two different states that can be identified optically by irradiation of a laser beam incident from the first substrate side, and the dielectric layer contains ZnS and Si as main components.

14 Claims, 5 Drawing Sheets

OPTICAL INFORMATION RECORDING MEDIUM AND RECORDING METHOD USING THE SAME

BACKGROUND OF THE INVENTION

1. Field of the Invention

The present invention relates to an optical information recording medium and a recording method using the same.

2. Description of the Related Art

Conventionally, it is known that a phase can be changed between an amorphous phase and a crystal phase by irradiating a laser beam onto a thin film made of a chalcogen material formed on a substrate. The research and development of a phase-change type optical information recording medium utilizing this phenomenon have been conducted actively.

In the phase-change type recording medium, a laser beam whose output is modulated between two power levels: a recording level and an erasure level are irradiated onto an information track of the recording medium, whereby a new signal can be recorded while an old signal is being erased.

Generally, in such a recording medium, a multi-layer film containing not only a phase-changeable recording layer but also other layers is used as an information layer for recording information. For example, a multi-layer film containing a protective layer made of a dielectric material or a reflective layer made of metal is used as an information layer.

The protective layer made of a dielectric material has the following functions of:

1) protecting a recording layer from mechanical damage from the outside;
2) increasing the rewritable number of times while reducing thermal damage that occurs in the case where a signal is rewritten repeatedly;
3) enhancing a change in optical characteristics by utilizing the interference effect by multi-reflection; and
4) preventing a chemical change due to the influence from the outside air.

As a material for the protective layer achieving the above-mentioned functions, an oxide such as $Al_2O_3$, $TiO_2$ and $SiO_2$, a nitride such as $Si_3N_4$ and AlN, an oxynitride such as Si—O—N (JP3(1991)-104038A), a sulfide such as ZnS and a carbide such as SiC have been conventionally proposed. As a material for the protective layer, ZnS—$SiO_2$ (JP63(1988)-103453A) that is a mixture of ZnS and $SiO_2$ also has been proposed. Among these materials, ZnS—$SiO_2$ is used for a commercialized phase-change type optical disk.

One of the reasons why ZnS—$SiO_2$ has been used is as follows: ZnS—$SiO_2$ has a relatively small thermal conductivity among dielectrics, so that it can suppress thermal diffusion during recording to enhance a recording sensitivity. Another reason is as follows: ZnO—$SiO_2$ has a small internal stress, so that cracking is unlikely to occur even if a thick layer is formed using this material, and adhesion with respect to a recording layer is high.

In an optical information recording medium, the recording density can be increased by shortening the wavelength of a laser beam to be radiated. The recording density also can be increased by increasing the numerical aperture of an objective lens for condensing a laser beam to decrease the spot diameter of the laser beam. The recording density also can be increased by recording information onto both grooves for guiding a laser beam and lands therebetween. Furthermore, the recording density can be increased by using a plurality of recording layers. A recording medium provided with a plurality of recording layers and a recording/reproducing method already have been disclosed (JP9(1997)-212917A, WO96/31875, JP2000-36130A). Furthermore, a layer recognizing member and a layer switching member for conducting recording/reproducing by selecting one recording layer from a plurality of recording layers have been disclosed (WO96/31875).

In the optical information recording medium, a general-purpose laser diode typically is used as a light source for recording/reproducing. This makes it necessary to conduct recording in a range of a limited laser output. Therefore, as described above, as a material for a dielectric layer adjacent to a recording layer, ZnS—$SiO_2$ has been used conventionally.

However, in order to record/reproduce a large capacity of information in a short period of time, there is a demand for recording/reproducing at a higher linear velocity. As a linear velocity is increased, a laser irradiation time per unit area is shortened, which makes it necessary to enhance the recording sensitivity of the recording layer. Particularly, in the case of a recording medium including a plurality of recording layers, it is very important to enhance the recording density of the recording layer placed at a position farthest from an incident surface of a laser. In this respect, there is a demand for a material replacing ZnS—$SiO_2$ that has been used conventionally. In order to enhance the recording sensitivity of the recording layer, it is required to use a protective layer made of a dielectric with a thermal conductivity lower than that of a conventional dielectric.

Furthermore, the protective layer made of a dielectric with a low thermal conductivity has an effect of suppressing the phenomenon (so-called cross-erasure) of erasing a part of a mark of an adjacent track by thermal diffusion during recording, and hence, such a protective layer is preferable for increasing a recording density.

SUMMARY OF THE INVENTION

Therefore, with the foregoing in mind, it is an object of the present invention to provide an optical information recording medium capable of recording information with satisfactory reliability even at a high linear velocity, a method for producing the same and a recording/reproducing method using the same.

In order to achieve the above-mentioned object, an optical information recording medium of the present invention includes: a first substrate, a second substrate placed in parallel with the first substrate and an information layer (A) placed between the first substrate and the second substrate, wherein the information layer (A) includes a recording layer and a dielectric layer placed so that a distance from the dielectric layer to the recording layer is 20 nm or less, the recording layer is changed between at least two different states that are identified optically by irradiation of a light beam incident from the first substrate side and the dielectric layer contains ZnS and Si as main components. The inventors of the present invention found that recording can be conducted at a lower laser power in the recording medium using a dielectric layer made of Zns—Si (mixture of ZnS and Si), compared with the recording medium using a dielectric layer made of Zns—$SiO_2$. More specifically, by using a dielectric layer made of Zns—Si, a recording medium with a high recording sensitivity can be obtained. Furthermore, Zns—Si is a material that is stable chemically and mechanically. Furthermore, since the film-formation speed by sputtering of Zns—Si is higher than that of Zns—$SiO_2$, Zns—Si is preferable in terms of productivity.

The above-mentioned optical information recording medium may include a plurality of information layers placed between the first substrate and the second substrate, and the information layer closest to the second substrate among the plurality of information layers may be the information layer (A).

In the above-mentioned optical information recording medium, the information layer (A) may include a reflective layer placed on the second substrate side with respect to the recording layer.

In the above-mentioned optical information recording medium, the recording layer may be changed reversibly between at least two different states that are identified optically. In this case, the recording layer may be made of an alloy containing Te and Sb. Furthermore, the recording layer may be made of an alloy selected from the group consisting of a Ge—Sb—Te based alloy, a Ge—Sn—Sb—Te based alloy, an Ag—In—Sb—Te based alloy and an Ag—In—Ge—Sb—Te based alloy. Furthermore, the recording layer may be made of a Ge—Sb—Te based alloy, and the alloy may contain Ge in an amount of 30 atomic % or more. Furthermore, the recording layer may be made of a Ge—Sn—Sb—Te based alloy, and the alloy may contain Ge and Sn in an amount of 30 atomic % or more in total. Furthermore, a thickness of the recording layer may be 3 nm to 20 nm.

In the above-mentioned optical information recording medium, the recording layer may be changed reversibly between two different states that are identified optically. In this case, the recording layer may be composed of Te, O and at least one element M selected from the group consisting of Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au and Bi. In this case, a content of oxygen in the recording layer may be 25 atomic % to 60 atomic %, and a content of the element M in the recording layer may be 1 atomic % to 35 atomic %. Furthermore, a thickness of the recording layer may be 5 nm to 70 nm.

Furthermore, in a method of the present invention for recording information onto an optical information recording medium having an information layer including a recording layer changed between at least two different states that are identified optically by irradiation of a light beam, and a dielectric layer containing ZnS and Si as main components, in a case where recording marks with the same length are formed in a first region where recording is conducted at a linear velocity of VL (m/sec.) and a second region where recording is conducted at a linear velocity of VH (m/sec.) larger than VL, recording is conducted by modulating the light beam between a first power and a second power smaller than the first power, and a time TL (sec.) for irradiating the light beam of the first power in the first region, a time TH (sec.) for irradiating the light beam of the first power in the second region, the VL and the VH satisfy a relationship: TL·VL<TH·VH.

These and other advantages of the present invention will become apparent to those skilled in the art upon reading and understanding the following detailed description with reference to the accompanying figures.

DESCRIPTION OF THE PREFERRED EMBODIMENTS

Figure 1:
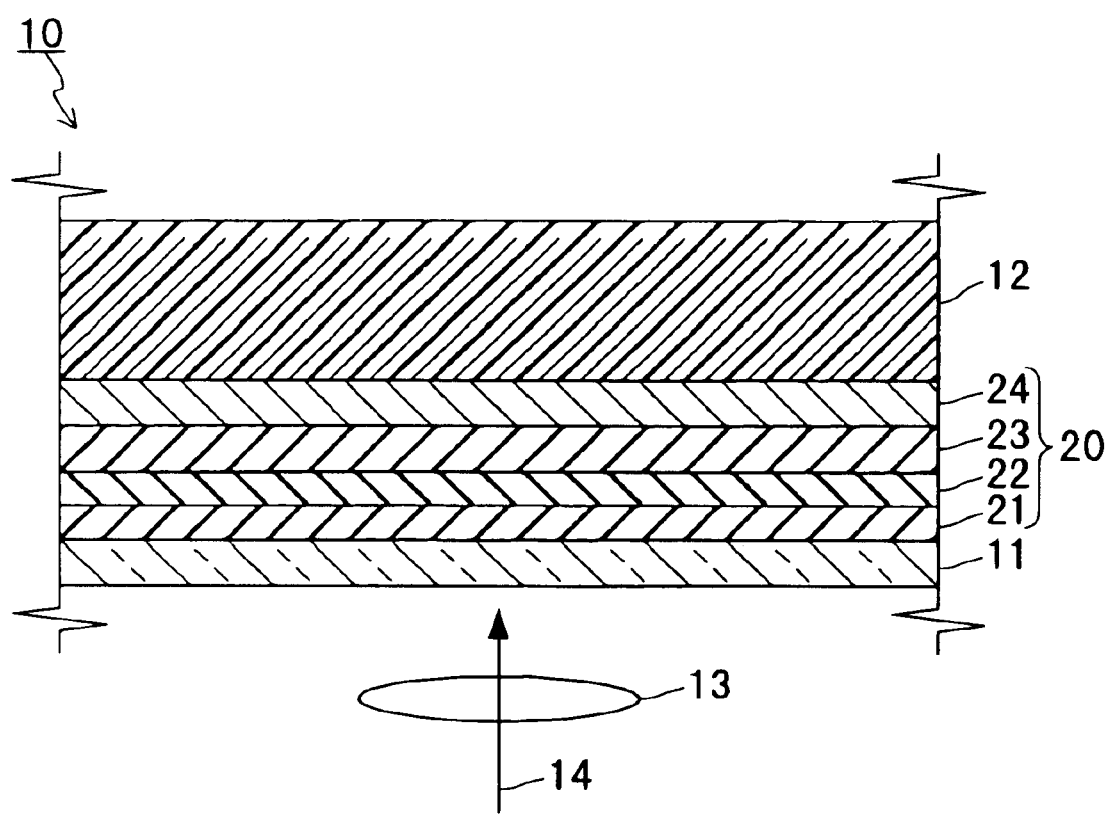
FIG. 1 is a partial cross-sectional view showing an example of an optical information recording medium according to the present invention.

Hereinafter, the present invention will be described by way of illustrative embodiments with reference to the drawings. In the following embodiments, like parts are denoted with like reference numerals, and repeated description may be omitted.

Embodiment 1

In Embodiment 1, as an example of the optical information recording medium of the present invention, a recording medium having one information layer will be described. FIG. 1 shows a partial cross-sectional view of an optical information recording medium 10 (hereinafter, which may be referred to as a "recording medium 10") of Embodiment 1.

The recording medium 10 includes a first transparent substrate 11, a second substrate 12 placed in parallel with the first substrate 11, and an information layer 20 (information layer (A)) placed between the first substrate 11 and the second substrate 12. In the recording medium 10, information is recorded and reproduced by a laser beam 14 incident from the first substrate 11 side through an objective lens 13. The wavelength of the laser beam 14 is, for example, in a range of 300 $\mu$m to 900 $\mu$m, and preferably is 500 $\mu$m or less for high-density recording.

Information is recorded onto the information layer 20. The information layer 20 is a multi-layer film in which a plurality of layers are stacked, including a lower dielectric layer 21, a recording layer 22, an upper dielectric layer 23 and a reflective layer 24 placed in this order from the first substrate 11 side. Herein, the term "lower" refers to the position on the first substrate 11 side with respect to the recording layer 22.

In the information layer 20, information is recorded/reproduced by the laser beam 14 passing through the first substrate 11. Therefore, it is preferable that the material for the first substrate 11 is substantially transparent to the wavelength of the laser beam 14. Examples of the material for the first substrate 11 include polycarbonate resin, polymethylmethacrylate resin, polyolefin resin, polynorbornene resin, UV-curable resin, glass or a material obtained by combining these resins. The first substrate 11 may have a disk shape. Although not particularly limited, the thickness of the first substrate 11 is in a range of 0.01 mm to 1.5 mm. The first substrate 11 may be formed by coating the lower dielectric layer 21 with the above-mentioned resin by spin coating, followed by curing.

The recording layer 22 is a rewritable recording layer in which information can be rewritten an arbitrary number of times, or a write-once recording layer in which information can be written in an unrecorded region only once. The recording layer 22 is changed between at least two different states that can be identified optically by irradiation of a light beam (typically, a laser beam) incident from the first substrate 11 side.

In the case where the recording layer 22 is of a rewritable type, it can be made of an alloy (chalcogenide) containing Te and Sb. For example, a Ge—Sb—Te based alloy and a Ge—Sn—Sb—Te based alloy can be used. Furthermore, an alloy (e.g., Ag—In—Sb—Te based alloy and Ag—In—Ge—Sb—Te based alloy) can be used, which is obtained by adding an element such as In, Ge, Au or Ag to an eutectic composition of Sb—Te. These materials are reversibly changed between a crystal phase and an amorphous phase by irradiation of the laser beam 14 for recording. In this case, the reflectivity of a portion in a crystalline state is different from that of a portion in an amorphous state. Therefore, both the states can be identified by irradiation of the laser beam 14 for reproducing. The Ge—Sb—Te based alloy refers to an alloy containing Ge, Sb and Te in an amount of 90 atomic % or more in total. Similarly, the Ge—Sn—Sb—Te based alloy refers to an alloy containing Ge, Sn, Sb and Te in an amount of 90 atomic % or more in total. This also applies to the other alloys.

Among the above-mentioned materials, in the case of using a Ge—Sb—Te based alloy containing Ge in an amount of 30 atomic % or more, or a Ge—Sn—Sb—Te based alloy containing Ge and Sn in an amount of 30 atomic % or more in total, the optical contrast between the crystal state and the amorphous state is increased, so that a large C/N (carrier to noise ratio) ratio can be obtained. On the other hand, these materials are likely to be increased in melting point, resulting in an insufficient recording sensitivity. Thus, in the case of using these materials, the effect of using a dielectric layer (described later) containing ZnS and Si as main components is particularly large.

In the case where the recording layer 22 is of a rewritable type, at least one element selected from the group consisting of O, N, F, C, S and B may be added to the material for the recording layer 22 so as to adjust the characteristics such as a thermal conductivity, an optical constant, heat resistance and reliability. These elements are added in an amount of 10 atomic % or less of the recording layer 22.

In the case where the recording layer 22 is of a rewritable type, a sufficient C/N ratio can be obtained by setting the thickness of the layer to be 3 nm to 20 nm. In the case where the thickness of the recording layer is 3 nm or more, sufficient reflectivity and change in reflectivity are obtained, so that a sufficient C/N ratio is obtained. In the case where the thickness of the recording layer 22 is 20 nm or less, thermal diffusion in the recording layer 22 can be prevented from becoming too large, so that a C/N ratio in high-density recording can be prevented from being decreased.

In the case where the recording layer 22 is of a write-once type, a recording layer made of Te, O (oxygen) and at least one element M selected from the group consisting of Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au and Bi can be used. For example, the recording layer 22 made of a material such as T—O—Pd or Te—O—Au can be used. The recording layer 22 made of these materials is irreversibly changed from an amorphous phase to a crystal phase by irradiation of the laser beam 14 for recording. These two states can be identified by irradiation of the laser beam 14 for reproducing. It is particularly preferable to use Pd or Au as the element M in terms of a sufficient crystallization speed and high environmental stability.

It is preferable that the material for the write-once recording layer 22 contains oxygen in an amount of 25 atomic % to 60 atomic %, and the element M in an amount of 1 atomic % to 35 atomic %. By setting the contents of oxygen and the element M in this range, a sufficient C/N ratio can be obtained. By setting the content of oxygen in the recording layer 22 to be 25 atomic % or more, a recording mark can be prevented from being enlarged too much because of too high thermal conductivity of the recording layer 22. Furthermore, by setting the content of oxygen in the recording layer 22 to be 60 atomic % or less, a recording mark can be prevented from being enlarged insufficiently even when a recording power is increased because of too low thermal conductivity of the recording layer 22. As a result, a satisfactory C/N ratio can be obtained. By setting the content of the element M in the recording layer to be 1% or more, the function of accelerating the crystal growth of Te during irradiation of a laser beam can be exhibited sufficiently. This can set a crystallization speed of the recording layer 22 at a satisfactory value, and a recording mark can be formed at a high speed. Furthermore, by setting the content of the element M in the recording layer 22 to be 35 atomic % or less, a change in reflectivity between an amorphous phase and a crystal phase can be increased, and a sufficient C/N ratio can be obtained.

Furthermore, in the case where the recording layer 22 is of a write-once type, at least one element selected from the group consisting of N, F, C, S and B may be added to the material for the recording layer 22 in order to enhance the characteristics such as a thermal conductivity, an optical constant, heat resistance or environmental stability. These elements are added in an amount of 10 atomic % or less of the recording layer 22.

In the case where the recording layer 22 is of a write-once type, a sufficient C/N ratio can be obtained by setting the thickness of the layer in a range of 5 nm to 70 nm. In the case where the thickness of the recording layer 22 is 5 nm or more, a sufficient reflectivity and change in reflectivity can be obtained. Furthermore, in the case where the thickness of the recording layer 22 is 70 nm or less, thermal diffusion in the recording layer 22 can be prevented from being increased too high, and a sufficient C/N ratio can be obtained even in high-density recording.

At least one layer selected from the lower dielectric layer 21 and the upper dielectric layer 23 is made of a dielectric containing ZnS and Si as main components. Herein, the term "main component" refers to ZnS and Si being contained in an amount of 90 mol % or more in total. In order to enhance the characteristics such as a thermal conductivity, an optical constant, heat resistance or environmental stability, at least one element selected from the group consisting of other elements such as O, N, F, C, S and B may be added to the dielectric. These elements are added in an amount of 10 atomic % or less, preferably 5 atomic % or less. It also is preferable that the added amount of an element does not exceed twice (more preferably, once) the amount of Si. There is no particular limit to a mixed ratio between ZnS and Si, and the content of ZnS is preferably in a range of 30 mol % to 98 mol %, more preferably in a range of 50 mol % to 95 mol %. More specifically, assuming that $(ZnS):(Si):(total\ of\ other\ elements)=(1-x-y):x:y$ in a molar ratio, it is preferable that $0.02 \leq x \leq 0.7$ and $0 \leq y \leq 0.7x$, and more preferable that $0.05 \leq x \leq 0.5$ and $0 \leq y \leq 0.5x$.

In the case where either one of the lower dielectric layer 21 and the upper dielectric layer 23 is not made of the above-mentioned dielectric, as a material for the dielectric layer, an oxide of an element such as Y, Ce, Ti, Zr, Nb, Ta, Co, Zn, Al, Si, Ge, Sn, Pb, Sb, Bi or Te can be used. A nitride of an element such as Ti, Zr, Nb, Ta, Cr, Mo, W, B, Al, Ga, In, Si, Ge, Sn or Pb also can be used. Furthermore, a carbide of an element such as Ti, Zr, Nb, Ta, Cr, Mo, W or Si can be used. A sulfide, a selenide, or a telluride of Zn or Cd also can be used. Furthermore, a fluoride of Mg or Ca also can be used, and C, Si or Ge can be used singly. A material made of these mixtures also can be used. More specifically, a mixture of ZnS and $SiO_2$, for example, can be used.

The reflective layer 24 can be made of metal such as Au, Ag, Cu, Al, Ni, Pd, Pt, Bi, Sb, Sn, Zn or Cr, or an alloy thereof. Furthermore, as the reflective layer 24, a multi-layer film composed of a plurality of dielectric layers with different refractive indexes may be used.

Figure 2:
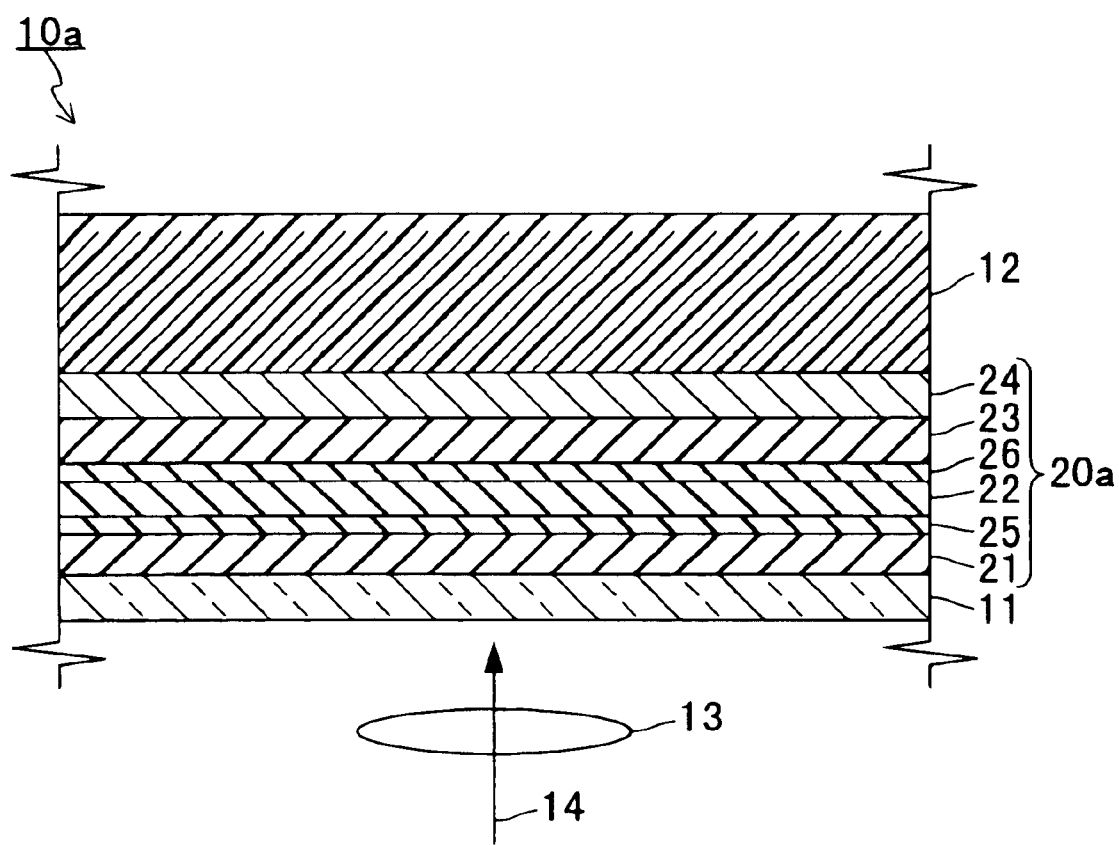
FIG. 2 is a partial cross-sectional view showing another example of the optical information recording medium according to the present invention.

The second substrate 12 has a function of protecting the information layer 20 of the recording medium 10. The second substrate 12 can be made of a material described regarding the first substrate 11. The material for the first substrate 11 may be different from that for the second substrate 12. Furthermore, the second substrate 12 may not be transparent to the wavelength of the laser beam 14. Although there is no particular limit to the thickness of the second substrate 12, it is about 0.01 mm to 3.0 mm, for example In FIG. 1, the recording medium 10 in which the recording layer 22 is in contact with the dielectric layers 21 and 23 has been described. However, an interface layer may be placed on at least one interface selected from the interface between the recording layer 22 and the lower dielectric layer 21 and the interface between the recording layer 22 and the upper dielectric layer 23. FIG. 2 is a partial cross-sectional view of an example of such a recording medium (recording medium 10a). In an information layer 20a of the recording medium 10a, an interface layer 25 is placed between the recording layer 22 and the lower dielectric layer 21, and an interface layer 26 is placed between the recording layer 22 and the upper dielectric layer 23. These interface layers have a function of enhancing erasure characteristics by accelerating the crystallization of the recording layer 22, and a function of enhancing repeated recording characteristics by preventing atoms from scattering between the recording layer 22 and the dielectric layers 21 and 23. These interface layers are required to have reliability so that peeling from the recording layer 22 and corrosion do not occur. As a material for the interface layers 25 and 26 satisfying such requirements, a nitride of Si or Ge having the high effect of accelerating crystallization and preventing atoms from scattering can be used (see JP5(1993)-2172 11A, WO97/34298).

In order to enhance the effect of the dielectric layer (the lower dielectric layer 21 and/or the upper dielectric layer 24) containing ZnS and Si as main components, it is required to set the distance between the dielectric layer and the recording layer 22 to be 20 nm or less (preferably, 10 nm or less). Thus, the thickness of the interface layer preferably is 0.5 nm to 20 nm.

Embodiment 2

Figure 3:
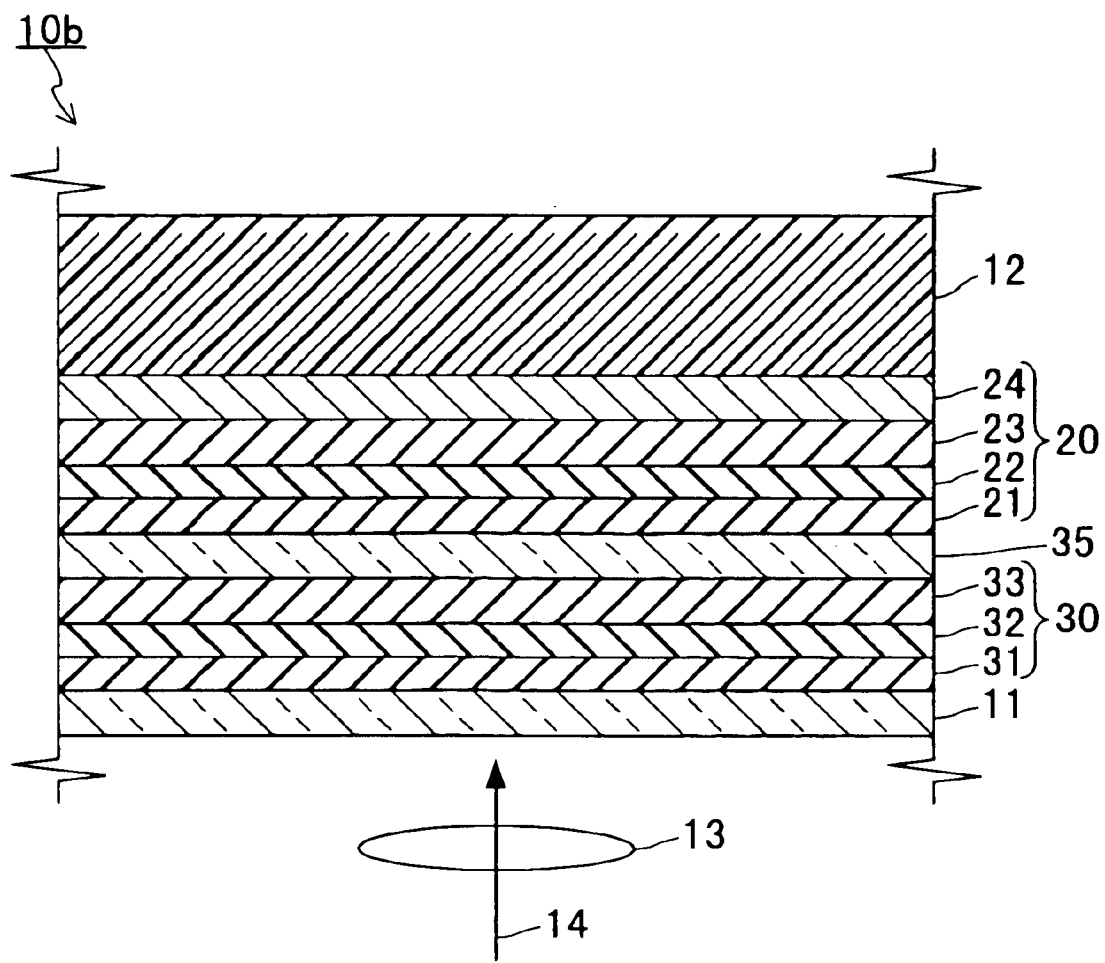
FIG. 3 is a partial cross-sectional view showing still another example of the optical information recording medium according to the present invention.

In Embodiment 2, as an example of the optical information recording medium of the present invention, a recording medium including a plurality of information layers will be described. FIG. 3 is a partial cross-sectional view of an optical information recording medium 10b (hereinafter, which may be referred to as a "recording medium 10b") of Embodiment 2.

The recording medium 10b includes a first transparent substrate 11, a second substrate 12 placed in parallel with the first substrate 11, information layers 20 and 30, and a separation layer 35. The information layer 30, and the separation layer 35 and the information layer 20 are placed in this order from the first substrate 11 side. In the recording medium 10b, information is recorded/reproduced by a laser beam 14 incident from the first substrate 11 side through an objective lens 13.

In the information layers 20 and 30, information is recorded independently. The information layer 20 is the same as that described in Embodiment 1. The information layer 30 includes a lower dielectric layer 31, a recording layer 32 and an upper dielectric layer 33 placed in this order from the first substrate 11 side. The information layer 30 may have a reflective layer placed between the upper dielectric layer 33 and the information layer 20. The reflectivity of the reflective layer in this case is set to be lower than that of the reflective layer 24 for the purpose of transmitting light required for recording/reproducing of the information layer 20. Furthermore, the information layer 30 may have an interface layer placed on at least one interface selected from the interface between the recording layer 32 and the lower dielectric layer 31 and the interface between the recording layer 32 and the upper dielectric layer 33.

The information layer 30 may be any of a rewritable type, a write-once type or reproduction-only type. Each layer of the information layer 30 can be made of the same material as that of the corresponding layer in the information layer 20. However, in order to transmit light required for recording/reproducing of the information layer 20, the transmittance of the information layer 30 preferably is 30% or more. In view of this, the material and thickness of each layer of the information layer 30 are set.

The separation layer 35 can be made of a UV-curable resin, for example. It is required to regulate the thickness of the separation layer 35 so that cross-talk from the other becomes small when information is reproduced from either one of the information layer 20 and 30. Therefore, the thickness of the separation layer 35 is required to be the same as or more than a focal depth $\Delta Z$. The focal depth $\Delta Z$ is determined by a numerical aperture NA of the objective lens 13 and a wavelength $\lambda$ of the laser beam 14. The focal depth $\Delta Z$ generally can be approximated as $\Delta Z = \lambda/\{2(NA)^2\}$, assuming that the intensity of a condensed point is 80% of that of a stigmatic point. For example, in the case of $\lambda=405$ nm and NA=0.65, $\Delta Z=0.479$ $\mu$m. Thus, $\pm 0.5$ $\mu$m is within the focal depth. Therefore, in the case of using this optical system, the thickness of the separation layer 35 is set to be larger than 1.0 $\mu$m. Furthermore, it is preferable that the thickness of the separation layer 35 is set so as to allow high-density recording/reproducing of information to be conducted in two information layers 20 and 30. Therefore, the thickness of the separation layer 35 is required to be set so that the distance between two recording layers is in a range in which light can be condensed by the objective lens 13.

FIG. 3 shows a recording medium including two information layers. However, in the information recording medium of the present invention, three or more information layers may be provided between the first substrate 11 and the second substrate 12. In this case, the above-mentioned information layer 20 is placed closest to the second substrate 12 among a plurality of information layers. The other information layers may have the same or different configurations from that of the information layer 20.

Furthermore, two recording media as described are prepared, and attached to each other so that the respective second substrates 12 are opposed to each other. Thus, the amount of information that can be accumulated in one medium can be increased twice.

Hereinafter, a method for producing the optical information recording medium described in Embodiments 1 and 2 will be described.

Each layer (excluding the separation layer 35) constituting the information layer of the recording medium can be formed by a general vapor phase deposition method such as vacuum deposition, sputtering, ion plating, CVD, and MBE. The separation layer 35 can be formed, for example, by applying a UV-curable resin by spin coating and curing the resin by irradiation of UV-light. The separation layer 35 also can be formed by attaching an adhesive sheet.

According to the production method of the present invention, the dielectric layer (the lower dielectric layer 21 and/or the upper dielectric layer 23) containing ZnS and Si as main components is formed by sputtering. More specifically, a target containing ZnS powder and Si powder is sputtered in a sputtering apparatus (in an atmosphere of an inert gas) in which an inert gas is allowed to flow, whereby a dielectric layer is formed. As the inert gas, Ar or Kr can be used, for example.

The recording medium can be formed by stacking the above-mentioned respective layers on the first substrate 11, and forming or attaching the second substrate 12 on the information layer. The recording medium also can be formed by stacking the above-mentioned respective layers on the second substrate 12, and forming or attaching the first substrate 11 on the information layer. The latter method is suitable for the case where the first substrate 11 is thin (0.4 mm or less). In the case where an uneven pattern (e.g., grooves or address pits for guiding a laser beam) on the second substrate 12 and the separation layer 35 in the latter method, it is required to use the second substrate 12 and the separation layer 35 on which an uneven pattern is formed previously. Such an uneven pattern can be formed by transferring the shape of a stamper on which an uneven pattern is formed by an injection method. Furthermore, in the case where it is difficult to form the uneven pattern by an injection method since a substrate and a separation layer to be formed are thin, a 2P method (photo-polymerization method) can be used.

Embodiment 3

In Embodiment 3, the recording method of the present invention will be described. The recording method is applicable to both a rewritable optical recording medium and a write-once optical recording medium.

Figure 4:
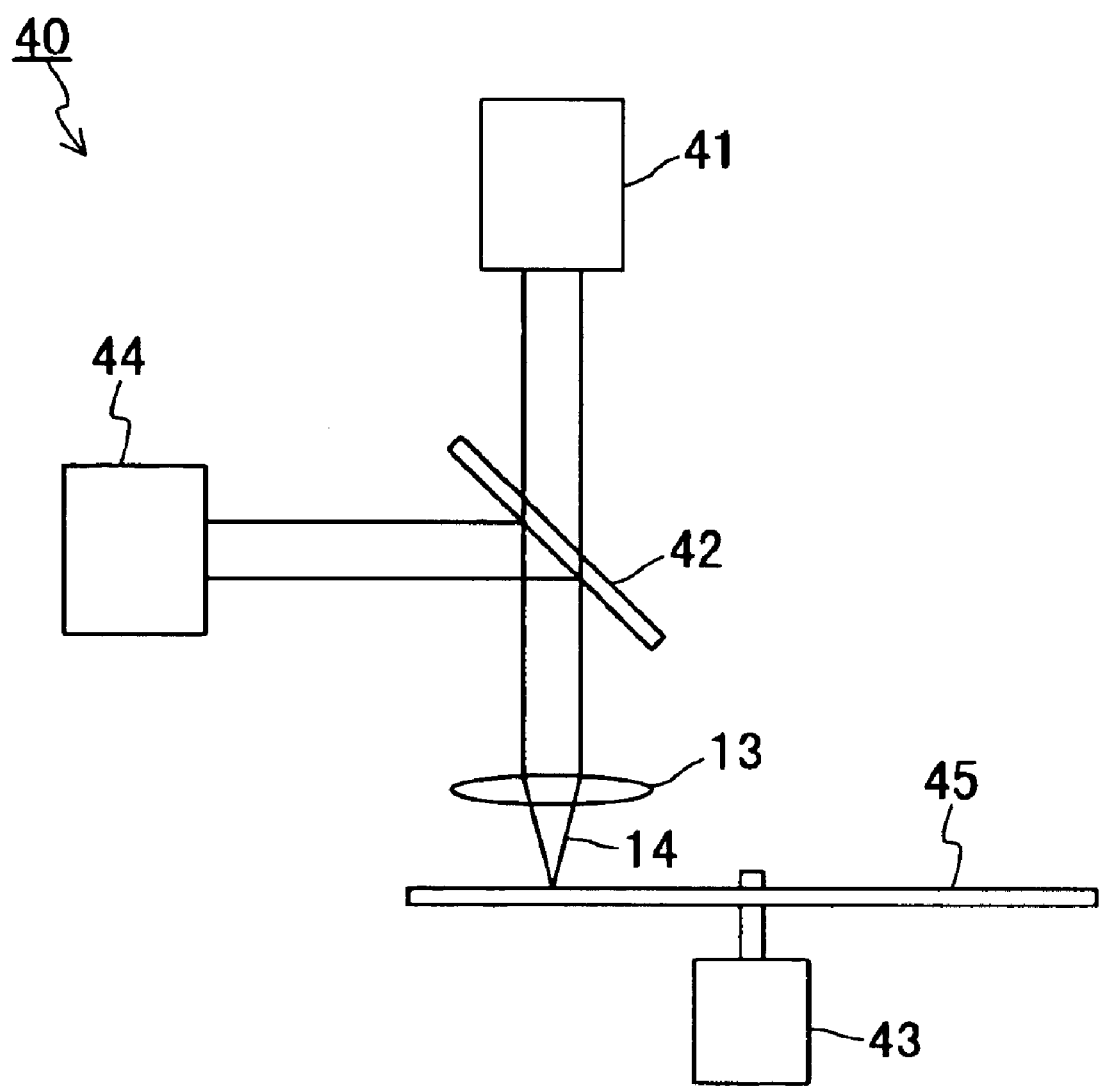
FIG. 4 is a view schematically showing an exemplary configuration of a recording/reproducing apparatus of the optical information recording medium according to the present invention.

FIG. 4 schematically shows an exemplary configuration of a recording/reproducing apparatus used in the recording method of the present invention. A recording/reproducing apparatus 40 in FIG. 4 includes a laser diode 41, a half mirror 42, a motor 43, a photodetector 44, and an objective lens 13. Recording/reproducing of the recording medium 45 is conducted by the recording/reproducing apparatus 40. The recording medium 45 is rotated by a motor 43. The recording medium 45 is the optical information recording medium of the present invention described in Embodiment 1 or 2.

A laser beam 14 emitted from the laser diode 41 passes through the half mirror 42 and the objective lens 13, and is focused onto the recording medium 45. The recording medium 45 is irradiated with the laser beam 14 having a particular power, whereby information is recorded. The recording medium 45 is irradiated with the laser beam 14 having a particular power, and its reflected light is detected by the photodetector 44, whereby information is reproduced.

When information signals are recorded, that is, recording marks are formed, the intensity of the laser beam 14 generally is modulated among a plurality of power levels. The intensity of the laser beam 14 can be modulated easily by modulating a driving current of the laser diode 41. The intensity of the laser beam 14 also can be modulated by using a member such as an electrooptical modulator and an acoustic optical modulator.

Figure 5:
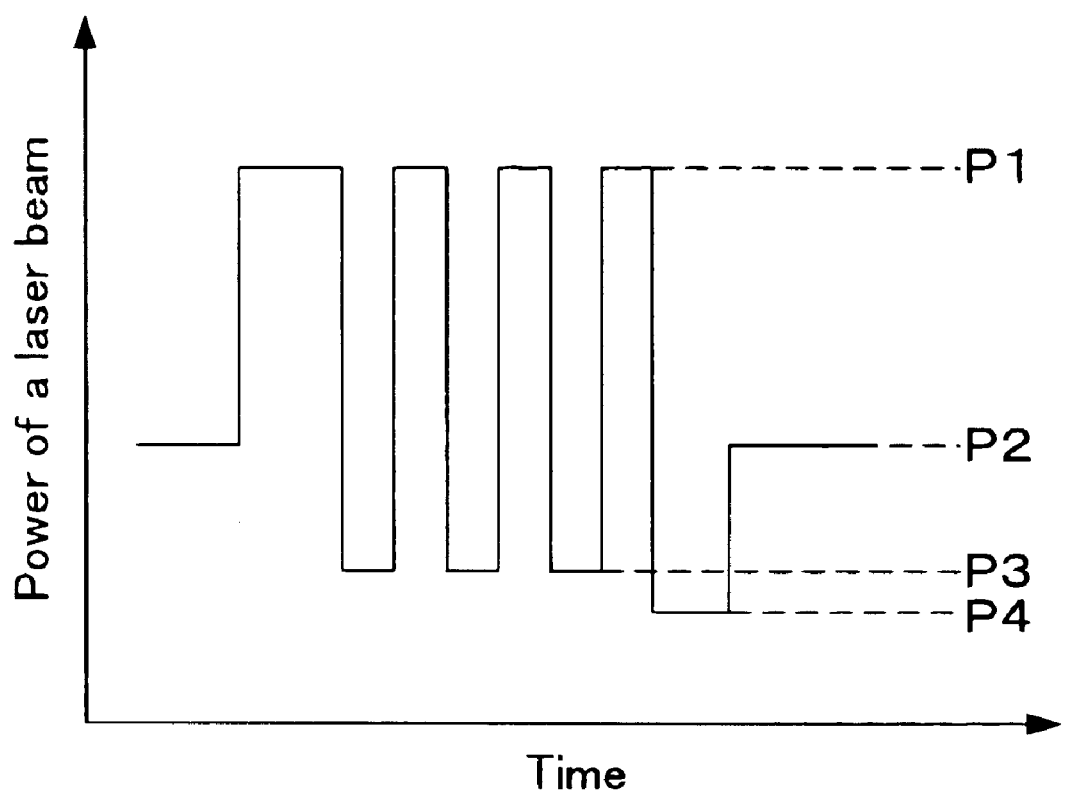
FIG. 5 is a view showing an example of the waveform of a laser beam used for recording a signal onto the optical information recording medium according to the present invention.

Recording marks can be formed by irradiating a recording layer with a laser beam with a single rectangular pulse of a peak power P1. However, in the case of forming a long recording mark, it is preferable to use a recording pulse train composed of a plurality of modulated laser pulses so as to prevent overheating to make the widths of recording marks uniform. FIG. 5 shows an example of such a recording pulse train. The horizontal axis of FIG. 5 represents a time, and the vertical axis thereof represents a power of a laser beam. In this pulse train, first, a laser pulse of a peak power P1 and a laser pulse of a bottom power P3 (P3<P1) are irradiated alternately to change a part of the recording layer, thereby forming recording marks. The trailing edge of the pulse train may be provided with a cooling period in which a cooling power P4 (P4<P3) is irradiated, as shown in FIG. 5. In a portion where recording marks are not to be formed, a laser beam with a power kept constant at a bias power P2 (P2<P1) is irradiated.

According to the recording/reproducing method of the optical information recording medium, recording/reproducing may be conducted at different linear velocities. Herein, recording in a first region where recording is conducted at a linear velocity of VL (m/sec.) and in a second region where recording is conducted at a linear velocity of VH (m/sec.) higher than that of VL will be described. Information is recorded by modulating the laser beam 14 to be irradiated between the peak power P1 (first power) and the bottom power P3 (second power) smaller than P1. Assuming that recording marks with the same length are formed in the first and second regions, the laser beam 14 of the peak power P1 is irradiated only for TL (sec.) in the first region, and the laser beam 14 of the peak power P1 is irradiated only for TH (sec.) in the second region. At this time, the values of VL, VH, TL and TH are determined so as to satisfy the relationship: TL·VL<TH·VH. As a linear velocity is increased, thermal interference among the recording marks becomes smaller. Therefore, when the value of TL·VL is set to be equal to that of TH·VH, recording marks in the first region recorded at a high linear velocity become small. Thus, it is required to make TH·VH appropriately larger than TL·VL so that the positions of mark edges are aligned even if recorded at different linear velocities.

A recording pattern is varied depending upon the length of a recording mark, the lengths of spaces before and after the recording mark, the length of an adjacent recording mark. The change in the recording pattern may cause misalignment in mark edge positions, which may increase jitter. According to the recording/reproducing method of the present invention, in order to prevent irregularity of mark edges so as to reduce jitter, the position or length of each pulse of the above-mentioned pulse train are regulated so that edge positions are aligned per pattern, whereby irregularity of the edge positions can be eliminated.

In the case where information signals thus recorded are reproduced, continuous light of a power level Pr (Pr<P1) is irradiated to a recording medium, and its reflected light is detected by the photodetector 44, whereby a change in the amount of reflected light is output as a reproducing signal.

Furthermore, in the case where information is recorded/reproduced with respect to the recording medium having a plurality of information layers as shown in FIG. 3, it is required to select one of a plurality of information layers to record/reproduce information. In order to realize this, a member for recognizing each information layer, a member for switching information layers to be recorded/reproduced, etc. are required. Such members are described, for example, in WO96/31875. Such members have been mounted in a commercialized reproducing apparatus of a reproduction-only DVD, and hence, such known members can be used.

EXAMPLES

Hereinafter, the present invention will be described in detail by way of illustrative examples. The present invention is not limited to the following examples.

Example 1

In Example 1, the case will be described where the optical disk of the present invention using a Zns—Si dielectric layer is compared with an optical disk using a Zns—$SiO_2$ dielectric layer in terms of a recording density. The optical disks produced in the present example are those of a write-once type and conduct recording by crystallizing an amorphous portion in a recording layer in groove portions.

Hereinafter, a method for producing an optical disk will be described. As a transparent substrate (first substrate 11), a substrate (diameter: about 12 cm, thickness: about 0.6 mm) made of polycarbonate resin and having grooves (pitch: 0.74 μm, depth: about 40 nm) on one surface was used.

A lower dielectric layer (thickness: about 80 nm) made of Zns—Si, a recording layer (thickness: about 50 nm) made of Te—O—Pd, an upper dielectric layer (thickness: about 140 nm) made of Zns—Si, and a reflective layer (thickness: about 80 nm) made of Al—Cr were stacked in this order on the surface of the transparent substrate where the grooves are formed.

The respective layers were formed by sputtering using a target with a diameter of about 100 mm and a thickness of about 6 mm. The lower dielectric layer and the upper dielectric layer were formed by using Zns—Si (molar ratio 80:20) as a target. The recording layer was formed by using Te—Pd (atomic ratio 90:10) as a target. The reflective layer was formed by using Al—Cr (atomic ratio 98:2) as a target. The lower dielectric layer and the upper dielectric layer were formed using an RF power source (applied power: 500 W), the recording layer was formed using a DC power source (applied power: 100 W), and the reflective layer was formed using a DC power source (applied power: 500 W). The recording layer was formed in an atmosphere (gas pressure: about 0.2 Pa) of a mixed gas of Ar and $O_2$ (flow ratio 45:55). The lower dielectric layer, the upper dielectric layer and the reflective layer were formed in an Ar gas atmosphere (gas pressure: about 0.2 Pa).

A dummy substrate (second substrate 12) was attached to the information layer thus formed with a UV-curable resin interposed therebetween, and thereafter, the resin was cured by irradiation of UV-light. Furthermore, the disk thus obtained was annealed at 90° C. for about 2 hours. Thus, an optical disk (hereinafter, referred to as a "disk A") of the present invention was produced.

On the other hand, an optical disk was produced in the same way as in the disk A, except that the lower dielectric layer and/or the upper dielectric layer was made of Zns—$SiO_2$ instead of Zns—Si. The dielectric layer made of Zns—$SiO_2$ was formed by sputtering using Zns—$SiO_2$ (molar ratio 80:20) as a target. An optical disk obtained by forming the lower dielectric layer only of Zns—$SiO_2$ is referred to as a "disk B". An optical disk obtained by forming only the upper dielectric layer of Zns—$SiO_2$ is referred to as a "disk C". An optical disk obtained by forming both the lower dielectric layer and the upper dielectric layer of Zns—$SiO_2$ is referred to as a "disk D". The thickness of the dielectric layer made of Zns—$SiO_2$ was set so as to obtain the same optical path length as that of the dielectric layer made of Zns—Si, in order that the optical characteristics were hardly varied even when a material was changed.

The reflectivity of an unrecorded portion in an amorphous state of the recording layer in the above-mentioned disks was measured by a spectroscope. The reflectivity was about 27% in the disks A, B, C and D.

A laser beam (wavelength: 660 nm) condensed by a lens (numerical aperture NA=0.6) was irradiated to the grooves on each of the above-mentioned disks, whereby a single signal of 4.3 MHz was recorded. Recording was conducted while the disk was rotated at a linear velocity of 3.5 m/sec. As the laser beam for recording, a single rectangular pulse (pulse width: 38.6 ns) modulated between the peak power P1 and the bias power P2 was used. The bias power P2 was set at 1.0 mW, and the reproduction power Pr also was set at 1.0 mW. Under this condition, recording was conducted only once on an unrecorded track with the varying peak power P1, and a C/N ratio of the signal was measured by a spectrum analyzer. Table 1 shows a peak power P1M at which a C/N ratio becomes maximum in each disk.

TABLE 1

| | Lower dielectric layer | Upper dielectric layer | P1M [mW] |
|---|---|---|---|
| Disk A | ZnS—Si | ZnS—Si | 4.0 |
| Disk B | ZnS—$SiO_2$ | ZnS—Si | 4.5 |
| Disk C | ZnS—Si | ZnS—$SiO_2$ | 5.0 |
| Disk D | ZnS—$SiO_2$ | ZnS—$SiO_2$ | 6.0 |

As the peak power P1M at which a C/N ratio becomes maximum is smaller, a recording density is higher. As shown in Table 1, the peak power P1M was 4.0 mW, 4.5 mW, 5.0 mW and 6.0 mW in the disks A, B, C and D, respectively. In any of the disks, the maximum value of a C/N ratio was about 54 dB.

As described above, in Example 1 in which recording by crystallization was conducted in the grooves of a write-once recording medium, an optical information recording medium with a high sensitivity was obtained by using a Zns—Si dielectric layer instead of a Zns—$SiO_2$ dielectric layer.

Example 2

In Example 2, the case will be described where the optical disk of the present invention using a Zns—Si dielectric layer is compared with an optical disk using a ZnS—$SiO_2$ dielectric layer in terms of a recording density. The optical disks produced in the present example are those of a rewritable type and conduct recording by changing a part of a recording layer from a crystalline phase to an amorphous phase in grooves and lands (flat portions between two adjacent grooves).

As a transparent substrate (first substrate 11), a substrate (diameter: about 12 cm, thickness: about 0.6 mm) made of polycarbonate resin and having grooves (groove width: 0.74 μm, land width: 0.74 μm, depth: about 70 nm) on one surface was used.

A lower dielectric layer (thickness: about 120 nm) made of Zns—Si, a recording layer (thickness: about 15 nm) made of Ge—Sb—Te, an upper dielectric layer (thickness: about 30 nm) made of Zns—Si, and a reflective layer (thickness: about 100 nm) made of Al—Cr were stacked in this order on the surface of the transparent substrate where the grooves are formed.

The respective layers were formed by sputtering using a target with a diameter of about 100 mm and a thickness of about 6 mm. The lower dielectric layer and the upper dielectric layer were formed by using Zns—Si (molar ratio 80:20) as a target. The recording layer was formed by using Ge—Sb—Te (atomic ratio 22:23:55) as a target. The reflective layer was formed by using Al—Cr (atomic ratio 98:2) as a target. The lower dielectric layer and the upper dielectric layer were formed using an RF power source (applied power: 500 W), the recording layer was formed using a DC power source (applied power: 100 W), and the reflective layer was formed using a DC power source (applied power: 500 W). The respective layers were formed in an atmosphere in which a gas pressure was kept at about 0.2 Pa.

A dummy substrate was attached to the information layer thus formed with a UV-curable resin interposed therebetween, and thereafter, the resin was cured by irradiation of UV-light. Furthermore, the disk thus obtained was irradiated with a laser beam, whereby the entire area of the recording layer was crystallized. Thus, an optical disk (hereinafter, referred to as a "disk E") of the present invention was produced.

On the other hand, an optical disk was produced in the same way as in the disk E, except that the lower dielectric layer and/or the upper dielectric layer was made of Zns—$SiO_2$ instead of Zns—Si. The dielectric layer made of Zns—$SiO_2$ was formed by sputtering using Zns—$SiO_2$ (molar ratio 80:20) as a target. An optical disk obtained by forming the lower dielectric layer of Zns—$SiO_2$ is referred to as a "disk F". An optical disk obtained by forming the upper dielectric layer of Zns—$SiO_2$ is referred to as a "disk G". An optical disk obtained by forming both the lower dielectric layer and the upper dielectric layer of Zns—$SiO_2$ is referred to as a "disk H". The thickness of the dielectric layer made of Zns—$SiO_2$ was set so as to obtain the same optical path length as that of the dielectric layer made of Zns—Si, in order that the optical characteristics were hardly varied even when a material was changed.

The reflectivity of a portion (unrecorded portion) in a crystalline state of the recording layer in the above-mentioned disks was measured by a spectroscope. The reflectivity was about 18% in the disks E, F, G and H.

A laser beam (wavelength: 660 nm) condensed by a lens (numerical aperture NA=0.6) was irradiated to the grooves and lands on each of the above-mentioned disks, whereby single signals of 9.7 MHz and 2.7 MHz were recorded alternately. Recording was conducted while the disk was rotated at a linear velocity of 6 m/sec. As the laser beam for recording, a rectangular pulse modulated between the peak power P1 and the bias power P2 was used. The signal of 9.7 MHz was recorded using a single pulse with a pulse width of 25.7 ns. The signal of 2.7 MHz was recorded using a pulse train composed of a leading pulse (pulse width: 25.7 ns) and subsequent 8 sub-pulses (pulse width and pulse interval: 8.6 ns). In the recording of both the signals, the bias power P2 was set at 4.0 mW, and the reproduction power Pr was set at 1.0 mW. Under this condition, 5 signals of 9.7 MHz and 5 signals of 2.7 MHz were recorded alternately on an unrecorded track. Thereafter, the peak power P1 further was changed to record a signal of 9.7 MHz, and a C/N ratio of the signal was measured by a spectrum analyzer. Table 2 shows a peak power P1M at which a C/N ratio becomes maximum in each disk.

TABLE 2

|  | Lower dielectric layer | Upper dielectric layer | P1M (Groove) [mW] | P1M (Land) [mW] |
| --- | --- | --- | --- | --- |
| Disk E | ZnS—Si | ZnS—Si | 9.0 | 9.0 |
| Disk F | ZnS—$SiO_2$ | ZnS—Si | 9.5 | 9.5 |

TABLE 2-continued

|  | Lower dielectric layer | Upper dielectric layer | P1M (Groove) [mW] | P1M (Land) [mW] |
| --- | --- | --- | --- | --- |
| Disk G | ZnS—Si | ZnS—$SiO_2$ | 10.5 | 10.5 |
| Disk H | ZnS—$SiO_2$ | ZnS—$SiO_2$ | 12.0 | 12.0 |

As shown in Table 2, the peak power P1M at which a C/N ratio becomes maximum was 9.0 mW, 9.5 mW, 10.5 mW and 12.0 mW in the disks E, F, G and H, respectively. In any of the disks, the maximum value of a C/N ratio was about 55 dB.

In order to check the environmental stability of these disks, they were allowed to stand for 500 hours in an environment at a temperature of 90° C. and a humidity of 80%RH. As a result, each of the disks exhibited satisfactory moisture resistance without any change in optical characteristics and recording/reproducing characteristics.

Thus, in Example 2 in which recording by changing a crystalline state to an amorphous state was conducted in the lands and grooves of a rewritable recording medium, an optical information recording medium with a high sensitivity was obtained by using a Zns—Si dielectric layer instead of a Zns—$SiO_2$ dielectric layer.

As described above, the optical information recording medium of the present invention has a high recording density. Therefore, according to the present invention, recording can be conducted with good reliability in recording at a high linear velocity or recording with respect to a plurality of information layers. Furthermore, according to the present invention, a method for producing the optical information recording medium of the present invention and a recording method thereof are provided.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical information recording medium, comprising: a first substrate, a second substrate placed in parallel with the first substrate and an information layer (A) placed between the first substrate and the second substrate,
    wherein the information layer (A) includes a recording layer and a dielectric layer placed so that a distance from the dielectric layer to the recording layer is 20 mini or less,
    the recording layer is changed between at least two different states that are identified optically by irradiation of a light beam incident from the first substrate sides and
    the dielectric layer contains ZnS and Si in an amount of 90 mol % or more in total.

2. An optical information recording medium according to claim 1, comprising a plurality of information layers placed between the first substrate and the second substrate, and
    an information layer closest to the second substrate among the plurality of information layers is the information layer (A).

3. An optical information recording medium according to claim 1, wherein the information layer (A) includes a reflective layer placed on the second substrate side with respect to the recording layer.

4. An optical information recording medium according to claim 1, wherein the recording layer is changed reversibly between at least two different states that are identified optically.

5. An optical information recording medium according to claim 4, wherein the recording layer is made of an alloy containing Te and Sb.

6. An optical information recording medium according to claim 4, wherein the recording layer is made of an alloy selected from the group consisting of a Ge-Sb-Te based alloy, a Ge-Sn-Sb-Te based alloy, an Ag-In-Sb-Te based alloy and an Ag-In-Ge-Sb-Te based alloy.

7. An optical information recording medium according to claim 4, wherein the recording layer is made of a Ge-Sb-Te based alloy, and the alloy contains Ge in an amount of 30 atomic % or more.

8. An optical information recording medium according to claim 4, wherein the recording layer is made of a Ge-Sn-Sb-Te based alloy, and the alloy contains Ge and Sn in an amount of 30 atomic % or more in total.

9. An optical information recording medium according to claim 4, wherein a thickness of the recording layer is 3 nm to 20 nm.

10. An optical information recording medium according to claim 1, wherein the recording layer is changed irreversibly between two different states that are identified optically.

11. An optical information recording medium according to claim 10, wherein the recording layer is composed of Te, 0 and at least one element M selected from the group consisting of Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W, Re, Os, Ir, Pt, Au and Bi.

12. An optical information recording medium according to claim 11, wherein a content of oxygen in the recording layer is 25 atomic % to 60 atomic %, and a content of the element M in the recording layer is 1 atomic % to 35 atomic %.

13. An optical information recording medium according to claim 12, wherein a thickness of the recording layer is 5 nm to 70 nm.

14. A method for recording information onto an optical information recording medium comprising an information layer including a recording layer changed between at least two different states that are identified optically by irradiation of a light beam, and a dielectric layer containing ZnS and Si in an amount of 90 mol % or more in total, wherein in a case where recording marks with the same length are formed in a first region where recording is conducted at a linear velocity of VL (m/sec.) and a second region where recording is conducted at a linear velocity of VH (m/sec.) larger than VL, recording is conducted by modulating the light beam between a first power and a second power smaller than the first power, and a time TL (sec.) for irradiating the light beam of the first power in the first region, a time TH (sec.) for irradiating the light beam of the first power in the second region, the VL and the VH satisfy a relationship: TL·VL<TH·VH.

* * * * *

UNITED STATES PATENT AND TRADEMARK OFFICE
CERTIFICATE OF CORRECTION

PATENT NO. : 6,764,736 B2
DATED : July 20, 2004
INVENTOR(S) : Kitaura et al.

It is certified that error appears in the above-identified patent and that said Letters Patent is hereby corrected as shown below:

Column 14,
Line 53, "mini or less," should read -- nm or less, --
Line 57, "sides and" should read -- side, and --

Column 15,
Line 31, "0 and at least" should read -- O and at least --

Signed and Sealed this

Twenty-second Day of February, 2005

JON W. DUDAS
*Director of the United States Patent and Trademark Office*